United States Patent [19]

Kabumoto et al.

[11] Patent Number: 5,723,510
[45] Date of Patent: Mar. 3, 1998

[54] METHOD OF MANUFACTURING THERMOPLASTIC POLYESTER FOAM SHEET

[75] Inventors: Akira Kabumoto; Naoki Yoshida; Masayasu Ito; Mitsunori Okada, all of Yokohama, Japan

[73] Assignee: The Furukawa Electric Co., Ltd., Tokyo, Japan

[21] Appl. No.: 661,652

[22] Filed: Jun. 11, 1996

[51] Int. Cl.$^6$ .................................................. C08J 9/04
[52] U.S. Cl. ...................... 521/182; 521/74; 521/79; 264/45.8; 264/50; 264/165; 264/177.17; 264/177.19; 264/210.3; 264/211.13; 264/211.2
[58] Field of Search ...................... 521/74, 79, 182; 264/50, 45.8, 165, 177.17, 177.19, 210.3, 211.13, 211.2

[56] References Cited

U.S. PATENT DOCUMENTS 4,473,665  9/1984  Martini-Vvedensky .

*Primary Examiner*—John M. Cooney, Jr.
*Attorney, Agent, or Firm*—Frishauf, Holtz, Goodman, Langer & Chick

[57] ABSTRACT

A method of manufacturing a thermoplastic polyester foam sheet comprises forming a roll by overlapping a thermoplastic polyester sheet and a separator on each other and rolling them, impregnating an inert gas into the thermoplastic polyester sheet while the roll is kept in a pressurized inert gas atmosphere, and foaming the thermoplastic polyester sheet by heating it under atmospheric pressure.

9 Claims, No Drawings

METHOD OF MANUFACTURING THERMOPLASTIC POLYESTER FOAM SHEET

BACKGROUND OF THE INVENTION

1. Field of the Invention

The present invention relates to a method of manufacturing a thermoplastic polyester foam sheet for use preferably as heat reserving material, heat insulating material, wrapping material, packing material, and materials for use in electronic parts.

2. Description of the Related Art

Hitherto, foamed plastics made of polyethylene, polystyrene, and polypropylene have been widely used in building materials and wrapping materials, taking advantage of lightweight and heat insulating property thereof. However, the foamed plastics are inferior in the properties such as mechanical strength and heat resistance.

In contrast, a thermoplastic polyester foam is superior in such properties. However, in the thermoplastic polyester foam obtained by an extrusion foaming method using a general foaming agent, large cells can not be produced uniformly. As a result, the performance including mechanical strength becomes insufficient, limiting its usage.

On the other hand, as a method of manufacturing a foamed plastic containing fine cells, a process described in U.S. Pat. No. 4,473,665 is known. The process comprises impregnating an inert gas into a polystyrene sheet under pressure; reducing the pressure applied to the sheet to create a supersaturated condition, thereby producing a large amount of cell nucleation sites; heating the sheet to a temperature of a grass transition point or more to permit the growth of cells; and then cooling the sheet to maintain the microcellular structure. By this method, a foamed plastic containing fine cells can be manufactured. However, this method is carried out in a batch process by using a small test piece as an object. Therefore, this method is disadvantageous in view of mass production.

To increase productivity, attempts have been made to manufacture a foamed plastic by use of various continuous processes. However, the methods hitherto known have problems in that it requires a long time to impregnate gas into a resin and in that it is difficult to form a seal between a pressurized portion and a nonpressurized portion.

SUMMARY OF THE INVENTION

An object of the present invention is to provide a method of manufacturing a thermoplastic polyester foam sheet, economically in a large amount, which contains fine cells and has excellent mechanical strength as well as good surface appearance.

The method of manufacturing a thermoplastic polyester foam sheet of the present invention comprises the steps of forming a roll by overlapping a thermoplastic polyester sheet and a separator each other and rolling them, and then impregnating an inert gas into the thermoplastic polyester sheet while the roll is being kept in a pressurized inert gas atmosphere (hereinafter referred to as the "first step"); and forming the thermoplastic polyester sheet by heating it under atmospheric pressure (hereinafter referred to as the "second step").

In the present invention, an organic solvent may be contained in the roll before impregnating the inert gas into the thermoplastic polyester sheet while the roll consisting of a thermoplastic polyester sheet and a separator is being kept in a pressurized inert gas atmosphere.

DETAILED DESCRIPTION OF THE PREFERRED EMBODIMENTS

Hereinbelow, the present invention will be described in detail.

In the first step of the present invention, a thermoplastic polyester sheet and a separator overlap each other are rolled to form a roll.

The thermoplastic polyester sheets to be used in the present invention, for example, include a sheet made of polyethylene telephthalate and a sheet made of polybutylene telephthalate. Furthermore, a polycarbonate-blended polyethylene telephthalate sheet or polybutylene telephthalate sheet may be used. Of them, the polyethylene telephthalate sheet is preferable.

In the present invention, to the thermoplastic polyester sheet, various additives may be added as long as they do not damage characteristics inherent in a resin. The additives include a crystalline nucleating agent, crystallization accelerator, cell nucleating agent, antioxidant, antistatic agent, antiultraviolet agent, pigments, dyes, lubricant, and the like.

To increase the productivity, a conceivable method is one which comprises forming a roll using only a long-length thermoplastic polyester sheet; impregnating an inert gas into the rolled thermoplastic polyester sheet thus obtained; and then heating the sheet thereby foaming. In this method, however, it is inevitable that the surfaces of the rolled sheet are partially in contact with each other. For this reason, when impregnated under pressure, the gas is incorporated in such a contact portion in a low amount, resulting in a non-uniform distribution of gas contents over the entire sheet. When the thus obtained thermoplastic polyester sheet containing an inert gas is foamed, an expansion ratio is high in the portion containing a large amount of gas; in contrast the expansion ratio is low in the portion containing a small amount of gas. Consequently, a foamed sheet having non-uniform cells is obtained. Therefore, it is important to find a method enabling an inert gas to impregnate uniformly into the entire surface of the thermoplastic polyester sheet.

Then, in the present invention, a thermoplastic polyester sheet and a separator are overlapped and rolled to form a roll, as mentioned above. As the separator to be used in the present invention, any separator may be used as long as it has voids to which an inert gas and an organic solvent (used if necessary) can come in and out freely, and as long as the penetration of the inert gas into itself is negligible. In particular, a nonwoven fabric made of synthetic fiber or metal wire mesh is preferable. As the nonwoven fabric, one made of polyolefin fiber or nylon fiber is preferable. In addition, a polyester nonwoven fabric may be preferably used as long as fibers are elongated and an inert gas hardly penetrates thereinto. As the wire mesh, the generally-called wire cloth woven in a manner of a plain weave, twill weave, plain basket weave, or twill basket weave, in other words, woven by passing a longitudinal wire and a lateral wire at a right angle. As the wire materials to be used herein, iron, copper, aluminium, titanium, and alloys thereof are preferable. In consideration of cost and lifetime, a stainless steel is more preferable.

It is required that the separator have a length virtually equal to or slightly longer than that of the thermoplastic polyester sheet. Whereas, the width of the separator is not necessarily the same as that of the thermoplastic polyester sheet. No problem will be posed if the separator has a width of at least 70% of the thermoplastic polyester sheet and if a separator is superimposed on the sheet so as to leave a clearance of 50 mm or less in width on the both sides.

In the present invention, it is required that the surfaces of the thermoplastic polyester sheet be apart from each other when a roll is formed by overlapping the sheet and the separator each other and rolling them. It is further required that an inert gas be sufficiently penetrated into the thermoplastic polyester sheet through the separator. These requirements vary depending on a weight per unit area and thickness of the nonwoven fabric when a nonwoven fabric is used, and vary depending on a mesh size and a diameter of the wire forming the mesh when a wire mesh is used.

The weight per unit area of the nonwoven fabric to be used in the present invention preferably falls in the range of 20 to 100 g/m$^2$. That is, if the weight per unit area is excessively small, the nonwoven fabric will be low in strength, producing wrinkles and breaks of the fabric when rolled up. As a result, the surfaces of the thermoplastic polyester sheet are in contact with each other, rendering the contact portion to have a different gas content. On the other hand, if the weight per unit area is excessively large, voids will be small in size, making it difficult for an inert gas to come in and out freely. As a result, it may not be possible to impregnate the gas into the thermoplastic polyester sheet in an amount required for foaming.

The thickness of the nonwoven fabric is preferably in the range of 50 to 300 μm. That is, if the nonwoven fabric is excessively thin, the separator will produce no effect. Virtually no difference is observed in comparison with the case of forming a roll with using a thermoplastic polyester sheet alone. On the other hand, if the nonwoven fabric is excessively thick, a shorter thermoplastic polyester sheet must be used to form a roll since an autoclave for use in impregnating a gas is limited in size. As a result, the magnitude of production scale becomes low, raising a production cost.

The mesh size of the metal wire mesh to be used in the present invention is preferably in the range of 10 to 500-mesh, and more preferably 50 to 200-mesh. That is, if the mesh size is smaller than 10-mesh, a mesh space (a space formed by thin wires) will be large. As a result, the marks of the thin wires forming a mesh are left on the thermoplastic polyester sheet in the form of projections and depressions, by being pressed by the sheet surfaces from the both sides. In addition, the amount of gas impregnated to the mesh space is lowered. This is because the metal is hard compared to the nonwoven fabric made of resin. On the other hand, if the mesh size exceeds 500-mesh, a mesh space will be extremely small, preventing the impregnation of the gas. Consequently, different levels of the gas content are obtained. The time required for the gas impregnation is increased, leading to high production cost.

In the first step of the present invention, the roll formed as mentioned above is placed in an autoclave and kept it under a pressurized inert gas atmosphere, thereby impregnating the inert gas into the thermoplastic polyester sheet. Incidentally, prior to the impregnation of the inert gas, an organic solvent may be impregnated into the roll, if necessary.

The inert gases to be used as a foaming agent in the present invention include helium, nitrogen, carbon dioxide, argon, and the like. Of these, carbon dioxide is preferable since it can be impregnated into the thermoplastic polyester sheet in a large amount. The pressure for impregnating the inert gas preferably falls in the range of 30 to 70 kg/mm$^2$, and more preferably 50kg/cm$^2$ or more. The impregnation of the inert gas is carried out for one hour or more, and more preferably until the gas ensures complete saturation. The impregnation time and gas amount required for saturation vary depending on type of the resin to be foamed and type of the inert gas, impregnation pressure, and thickness of the sheet. For example, in the case where carbon dioxide is impregnated into a polyethylene telephthalate sheet at a pressure of 60 kg/cm$^2$, it is preferred that impregnation be carried out for 24 hours or more when a 0.6 mm-thick sheet is used, and for 96 hours or more when a 0.9 mm-thick sheet is used. In such conditions, the amount of carbon dioxide impregnated into the resin will be 6 to 7 weight %.

In the present invention, degree of crystallinity of the thermoplastic polyester sheet is preferably 30% or more before the sheet is foamed by heating in the second step. This is because if the degree of crystallinity is less than 30%, the rigidity of the resin will be low and large foams are produced when heated in the second step, with the result that it will be difficult to obtain a foamed sheet of good appearance, having no projections and depressions and a high mechanical strength. Whereas, if the degree of crystallinity exceeds 50%, the rigidity of the resin will be excessively large, making it difficult to perform foaming. Even through foamed, the foamed sheet will be weak and thus unsuitable for use in practice.

If the inert gas is impregnated even immediately after the roll is formed as mentioned above, the purpose of raising the crystallinity to 30% or more by impregnating an inert gas into the sheet uniformly, can be sufficiently attained. However, in this case, if the rigidity of the sheet is not sufficient when the gas is impregnated, the mark of a separator such as projections and depressions will be sometimes remained on the sheet after the gas impregnation is completed, depending on a type of the separator to be employed.

To circumvent such problems, it is preferred that the rigidity of the sheet is increased by raising crystallinity to 30% or more by impregnating an organic solvent into the roll of the sheet before the inert gas impregnation treatment. The organic solvents to be used for raising the crystallinity of the sheet for the aforementioned purpose include benzene, toluene, methyl ethyl ketone, ethyl formate, acetone, acetic acid, dioxane, m-cresol, aniline, acrylonitrile, dimethyl phthalate, nitroethane, nitromethane, benzyl alcohol, and the like. Of these, ketone-based organic solvents such as methyl ethyl ketone and acetone are more preferable. In particular, acetone is the most preferable.

For the process for impregnating the organic solvent into the roll, use is made of a method in which the roll is immersed in an organic solvent or a method in which the roll is kept in the vapor of an organic solvent. The latter method is superior to the former one in that only small amount of the organic solvent is required and in that the additives added to the thermoplastic polyester sheet seldom elute.

The treatment time for impregnating the organic solvent into the roll varies depending on type of the resin to be foamed and thickness of the sheet. It may be sufficient if the treatment is performed for a time period ranging from several hours to several tens hours. Even if the treatment is performed over the time period, the content of the organic solvent impregnated in the resin will not be increased so much. For example, in the case where acetone is impregnated into a roll made of polyethylene telephthalate placed in a sealed vessel saturated with an acetone vapor at room temperature under atmospheric pressure, 24 hours or more is sufficient for the treatment time when 0.6 mm-thick sheet is used and 48 hours or more is sufficient when 0.9 mm-thick sheet is used. By this treatment, the content of acetone in the resin will be 4 to 5 weight %.

In the meantime, when the crystallinity of the sheet is increased by impregnating an organic solvent into the roll in advance, the impregnation time of an inert gas will be shortened since it is no longer necessary to increase the crystallinity by impregnating a large amount of an inert gas. For example, in the case where carbon dioxide is impregnated into a polyethylene telephthalate sheet under a pressure of 60 kg/cm$^2$, one hour or more is sufficient for the treatment time if the sheet has a thickness of 0.6 mm and 2 hours or more if the sheet has a thickness of 0.9 mm.

In the second step of the present invention, the thermoplastic polyester sheet with an inert gas impregnated therein, obtained in the first step is foamed by heating it under atmospheric pressure. The heating means to be used in the second step include an air oven, oil bath, molten salt bath, and the like. The heating temperature is set to a temperature ranging from a glass transition point to a melting point of the resin.

To be more specific, the roll is taken out of the autoclave, and then only a sheet is passed through an air oven while being separated from a separator. As the foaming condition, for example, a temperature is set to about 240° C., a foaming time to 1 to 5 minutes. Thereafter, the foamed sheet is formed flat by a heated roller, immediately upon taking out of the air oven. The temperature for the roller at that time is preferably 150° C. or more. The flat sheet is further cooled to obtain a desired foamed sheet.

As mentioned in the foregoing, since an inert gas is impregnated into the roll-form sheet formed by providing a nonwoven fabric or a wire mesh as a separator to the thermoplastic polyester sheet in the method of the present invention, an inert gas can be uniformly impregnated into entire surface of the sheet even though the sheet is long. When such a sheet is foamed by heating, a foamed sheet containing fine cells can be obtained at a uniform expansion ratio. Therefore, despite that the gas impregnation is performed in a batch process, a foamed sheet having a good surface appearance and a high mechanical strength can be produced in a large quantity. If the crystallinity and thus the rigidity of the sheet are increased by impregnating an organic solvent into the sheet before an inert gas is impregnated into the sheet constituting the roll, a foamed sheet improved in surface appearance can be obtained since the mark of a separator is not remained even if any type of separator is used.

EXAMPLES

Hereinbelow, Examples of the present invention will be explained.

Example 1

Prepared were a polyethylene telephthalate (PET) sheet roll of 300 mm wide×60 m long×0.9 mm thick (C-0312 grade, manufactured by Unitika Ltd.) and, as a separator, a polyolefin-based nonwoven fabric roll of 300 mm wide×60 m long×160 μm thick and having weight per area of 55 g/m$^2$ (FT 300 grade, manufactured by Japan Vilene Co., Ltd.). They were overlapped and rolled to form a new roll in such a way that surfaces of the PET sheet were not in contact with each other. The roll was placed in an autoclave. A carbon dioxide gas was then impregnated into the roll for 96 hours under a pressure of 60 kg/cm$^2$.

At this point, the gas content in the PET sheet was 6.3 weight %. When a PET test piece of 10 mm wide×50 mm long×0.9 mm thick was placed in the autoclave and a carbon dioxide gas was impregnated thereinto in the same condition as above, the gas content was 6.5 weight %. As described above, since a carbon dioxide gas was impregnated in the roll provided with a nonwoven fabric in the method of the present invention, even in the long PET sheet of 60 m, the gas content was the same as in the case where a carbon dioxide gas was impregnated in a small test piece.

The crystallinity of the PET sheet containing the gas was 33% as measured by a differential scanning calorimeter (DSC).

After the roll was taken out of the autoclave, while the polyolefin-based nonwoven fabric was being removed, only the PET sheet was fed into an air oven set at 240° C. in a continuous manner so as to give one minute for foaming, and was foamed.

The obtained foamed sheet contained cells of 20 μm or less in size, uniformly. The expansion ratio was 3.5 times. Although the pattern of the nonwoven fabric was slightly observed on the sheet surface, good glossy appearance was obtained.

Example 2

Prepared were a PET sheet roll of 300 mm wide×60 m long×0.9 mm thick (C-0312 grade, manufactured by Unitika Ltd.) and, as a separator, a nylon-based nonwoven fabric roll of 300 mm wide×60 m long×150 μm thick and of 65 g/m$^2$ (FT 765 grade, manufactured by Japan Vilene Co., Ltd.). They were overlapped and rolled to form a new roll in such a way that surfaces of PET sheet were not in contact with each other. The roll was placed in an autoclave. A carbon dioxide gas was impregnated into the roll for 96 hours under a pressure of 60 kg/cm$^2$.

At this point, the gas content in the PET sheet was 6.4 weight %. The crystallinity of the PET sheet was 32% as measured by DSC.

After the roll was taken out of the autoclave, while the nylon-based nonwoven fabric was being removed, only the PET sheet was fed into an air oven set at 240° C. in a continuous manner so as to give one minute for foaming, and was foamed.

The obtained foamed sheet contained cells of 20 μm or less in size, uniformly. The expansion ratio was 3.8 times. Although the pattern of the nonwoven fabric was slightly observed on the sheet surface, good glossy appearance was obtained.

Example 3

Prepared were a PET sheet roll of 300 mm wide×60 m long×0.9 mm thick (C-0312 grade, manufactured by Unitika Ltd.) and, as a separator, a stainless mesh roll of 300 mm wide×60 m long, having 100-mesh and a wire diameter of 0.1 mm (manufactured by Taiyo Wire K.K.). They were overlapped and rolled to form a new roll in such a way that the surfaces of the PET sheet were not in contact with each other. The roll was placed in an autoclave. A carbon dioxide gas was impregnated into the roll for 96 hours under a pressure of 60 kg/cm$^2$.

At this point, the gas content in the PET sheet was 6.2 weight %. The crystallinity of the PET sheet was 33% as measured by DSC.

After the roll was taken out of the autoclave, while the stainless mesh was being removed, only the PET sheet was fed into an air oven set at 240° C. in a continuous manner so as to give one minute for foaming, and was foamed.

The obtained foamed sheet contained cells of 20 μm or less in size, uniformly. The expansion ratio was 4.0 times.

Although the pattern of the stainless mesh was slightly observed on the sheet surface, good glossy appearance was obtained.

Example 4

Prepared were a PET sheet roll of 300 mm wide×60 m long×0.9 mm thick (C-0312 grade, manufactured by Unitika Ltd.) and, as a separator, a stainless mesh roll of 300 mm wide×60 m long, having 50-mesh and a wire diameter of 0.14 mm (manufactured by Taiyo Wire K. K.). They were overlapped and rolled to form a new roll in such a way that the surfaces of the PET sheet were not in contact with each other. The roll was placed in an autoclave. A carbon dioxide gas was impregnated into the roll for 96 hours under a pressure of 60 kg/cm$^2$.

At this point, the gas content in the PET sheet was 6.1 weight %. The crystallinity of the PET sheet was 31% as measured by DSC.

After the roll was taken out of the autoclave, while the stainless mesh was being removed, only the PET sheet was fed into an air oven set at 240° C. in a continuous manner so as to give one minute for foaming, and was foamed.

The obtained foamed sheet contained cells of 20 µm or less in size, uniformly. The expansion ratio was 3.9 times. Although the pattern of the stainless mesh was slightly observed on the sheet surface, good glossy appearance was obtained.

Example 5

Use were made of the same PET sheet roll and polyolefin-based nonwoven fabric roll as employed in Example 1. They were overlapped and rolled up to form a new roll. The roll was immersed in acetone at room temperature for 24 hours. Subsequently, the roll was taken out of acetone and the polyolefin-based nonwoven fabric was removed. After acetone remained on the surface of the PET sheet was gently wiped and again rolled the PET sheet together with a dried nonwoven fabric to make a roll. At this point, the crystallinity of the PET sheet was 30% as measured by DSC.

The roll was placed in an autoclave to impregnate a carbon dioxide gas under a pressure of 60 kg/cm$^2$ for 2 hours. Since the PET sheet immersed in acetone had the crystallinity of 30% or more, time period of about 2 hour was sufficient for gas impregnation treatment. Incidentally, in the sample experienced acetone immersion treatment, acetone was contained in an amount of about 10 weight %. Since acetone vaporized from the PET sheet, the gas content could not be measured accurately.

After the roll was taken out of the autoclave, while the olefin-based nonwoven fabric was being removed, only the PET sheet was fed into an air oven set at 240° C. in a continuous manner so as to give one minute for foaming, and was foamed.

The obtained foamed sheet contained cells of 20 µm or less in size, uniformly. The expansion ratio was 5.0 times. The surface of the obtained foamed sheet was very smooth and glossy, exhibiting an excellent appearance.

Example 6

Use were made of the same PET sheet roll and stainless mesh roll as employed in Example 3. They were overlapped and rolled up to form a new roll. The roll was immersed in acetone at room temperature for 24 hours. Subsequently, the roll was taken out of acetone and the stainless mesh was removed. After acetone remained on the surface of PET sheet was gently wiped and again rolled the PET sheet together with a dried stainless mesh to make a roll, again. At this point, the crystallinity of the PET sheet was 31% as measured by DSC. The roll was placed in an autoclave to impregnate a carbon dioxide gas under a pressure of 60 kg/cm$^2$ for 2 hours.

After the roll was taken out of the autoclave, while the stainless mesh was being removed, only the PET sheet was fed into an air oven set at 240° C. in a continuous manner so as to give one minute for foaming, and was foamed.

The obtained foamed sheet contained cells of 20 µm or less in size, uniformly. The expansion ratio was 5.3 times. The surface of the obtained foamed sheet was very smooth and glossy, exhibiting an excellent appearance.

Example 7

Use were made of the same PET sheet roll and polyolefin-based nonwoven fabric roll as employed in Example 1. They were overlapped and rolled up to form a new roll. The roll was kept in a sealed vessel saturated with an acetone vapor at room temperature under atmospheric pressure for 48 hours. Subsequently, the roll was taken out of the sealed vessel and the content of acetone was measured. It was 5 weight %. The crystallinity of the PET sheet was 32% as measured by DSC.

The roll was placed in an autoclave to impregnate a carbon dioxide gas under a pressure of 60 kg/cm$^2$ for 2 hours. Since the PET sheet experienced acetone vapor treatment had the crystallinity of 30% or more, the time period of about 2 hour was sufficient for gas impregnation treatment. Incidentally, in the sample, acetone was contained in an amount of about 5 weight %. Since acetone vaporized from the sheet, the gas content could not be measured accurately.

After the roll was taken out of the autoclave, while the polyolefin-based nonwoven fabric was being removed, only the PET sheet was fed into an air oven set at 240° C. in a continuous manner so as to give one minute for foaming, and was foamed.

The obtained foamed sheet contained cells of 20 µm or less in size, uniformly. The expansion ratio was 4.8 times. The surface of the obtained foamed sheet was very smooth and glossy, exhibiting an excellent appearance.

Comparative Example 1

A PET sheet roll of 300 mm wide×60 m long×0.9 mm thick (C-0312 grade, manufactured by Unitika Ltd.) was wound round a pulp tube having an outer diameter of 100 mm. After the pulp tube was removed, the roll was placed in an autoclave to impregnate a carbon dioxide gas into the roll for 96 hours under a pressure of 60 kg/cm$^2$.

At this point, the gas content in the PET sheet was 5.3 weight %. As measured by DSC, the crystallinity of the PET sheet was greatly varied from 17% of a sheet surface portion in contact with another surface, to 31% of a sheet surface portion not in contact with another surface.

The roll taken out of the autoclave was fed into an air oven set at 240° C. in a continuous manner so as to provide one minute for foaming, and was foamed.

In the obtained foamed sheet, portions having an expansion ratio as high as 3 times and portions having an expansion ratio as low as 2 times were present. In addition, cells contained in the sheet were greatly distorted and thus had ununiform shapes.

Comparative Example 2

Use were made of the same PET sheet roll and polyolefin-based nonwoven fabric roll as employed in Example 1. They were overlapped and rolled up to form a new roll. The roll was placed in an autoclave to impregnate a carbon dioxide gas under a pressure of 60 kg/cm² for 24 hours.

At this point, the gas content in the PET sheet was 6.0 weight %. The crystallinity of the PET sheet was 15% as measured by DSC.

After the roll was taken out of the autoclave, while the olefin-based nonwoven fabric was being removed, only the PET sheet was fed into an air oven set at 240° C. in a continuous manner so as to give one minute for foaming, and was foamed.

The obtained foamed sheet had uniform cells and an expansion ratio of 5.8 times. However, since the foams were as large as 80 μm in size, dull surface was obtained. In addition, the mechanical strength was inferior compared to the samples of Examples 1 to 6.

Comparative Example 3

Prepared were a PET sheet roll of 300 mm wide×60 m long×0.9 mm thick (C-0312 grade, manufactured by Unitika Ltd.) and, as a separator, a nylon-based nonwoven fabric roll of 300 mm wide×60 m long×360 μm thick, and having weight per area of 108 g/m² (FT 214 grade, manufactured by Japan Vilene Co., Ltd.). They were overlapped and rolled to form a new roll in such a way that surfaces of PET sheet were not in contact with each other. The roll was placed in an autoclave. A carbon dioxide gas was impregnated into the roll for 96 hours under a pressure of 60 kg/cm².

At this point, the gas content in the PET sheet was 5.0 weight %. The crystallinity of the PET sheet was 20% as measured by DSC.

After the roll was taken out of the autoclave, while the nylon-based nonwoven fabric was being removed, only the PET sheet was fed into an air oven set at 240° C. in a continuous manner so as to give one minute for foaming, and was foamed.

The obtained foamed sheet had uniform cells. However, since the obtained foamed sheet had a low gas content and thus had a low crystallinity, the diameters of cells were as large as 100 μm. Accordingly, projections and depressions are present on the surface of the sheet, exhibiting dull appearance.

Comparative Example 4

Prepared were a PET sheet roll of 300 mm wide×60 m long×0.9 mm thick (C-0312 grade, manufactured by Unitika Ltd.) and, as a separator, a stainless mesh roll of 300 mm wide×60 m long having 4-mesh and a wire diameter of 1.6 mm (manufactured by Taiyo Wire K. K.). They were overlapped and rolled to form a new roll in such a way that the surfaces of the PET sheet were not in contact with each other. The roll was placed in an autoclave. A carbon dioxide gas was impregnated into the roll for 96 hours under a pressure of 60 kg/cm².

At this point, the gas content in the PET sheet was 6.0 weight %. The crystallinity of the PET sheet was greatly varied from 20% of a sheet surface portion in contact with a mesh wire, to 33% of a sheet surface portion not in contact with a mesh wire as measured by DSC.

After the roll was taken out of the autoclave, while the stainless mesh was being removed, only the PET sheet was fed into an air oven set at 240° C. in a continuous manner so as to give one minute for foaming, and was foamed.

In the obtained foamed sheet, portions having an expansion ratio as high as 4.2 times and portions having an expansion ratio as low as 2.5 times were present. In addition, cells formed in the sheet were greatly distorted and thus have ununiform shapes. Furthermore, lattice pattern of the wire mesh was clearly left on the sheet surface.

What is claimed is:

1. A method of manufacturing a thermoplastic polyester foam sheet comprising the steps of:

forming a roll by overlapping and rolling a thermoplastic polyester sheet and a separator, said separator being formed of a nonwoven fabric having a weight per area of 20 to 100 g/m² and a thickness of 50 to 300 μm;

impregnating said thermoplastic polyester sheet with carbon dioxide gas while said roll is kept in a pressurized carbon dioxide atmosphere of at least 30 kg/cm² to thereby attain a degree of crystallinity in said thermoplastic polyester sheet of at least 30%; and heating said thermoplastic polyester sheet under atmospheric pressure to a temperature ranging from a glass transition point to a melting point to thereby foam said thermoplastic polyester sheet.

2. The method according to claim 1, wherein said thermoplastic polyester comprises polyethylene telephthalate.

3. The method according to claim 1, wherein said nonwoven fabric comprises one of polyolefin, nylon, and polyester.

4. The method according to claim 1, wherein a pressure of the carbon dioxide atmosphere in which said roll in kept is at least 50 kg/cm2.

5. The method according to claim 1, wherein said roll is kept in the pressurized carbon dioxide atmosphere for at least one hour.

6. The method according to claim 1, wherein an organic solvent is impregnated into said roll before said roll is kept in the pressurized carbon dioxide atmosphere.

7. The method according to claim 6, wherein a degree of crystallinity of said thermoplastic polyester sheet after said organic solvent is impregnated into said roll is at least 30%.

8. The method according to claim 6, wherein said organic solvent comprises acetone.

9. The method according to claim 1, wherein acetone is impregnated into said roll by keeping said roll in an acetone vapor, before said roll is kept in the pressurized carbon dioxide atmosphere.

* * * * *